United States Patent
Ruppert

(10) Patent No.: US 12,071,086 B2
(45) Date of Patent: Aug. 27, 2024

(54) ON-BOARD POWER SYSTEM FOR A MOTOR VEHICLE, AND METHOD FOR OPERATING AN ON-BOARD POWER SYSTEM

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/997,957

(22) PCT Filed: Apr. 30, 2021

(86) PCT No.: PCT/EP2021/061364
§ 371 (c)(1),
(2) Date: Nov. 4, 2022

(87) PCT Pub. No.: WO2021/224120
PCT Pub. Date: Nov. 11, 2021

(65) Prior Publication Data
US 2023/0182662 A1    Jun. 15, 2023

(30) Foreign Application Priority Data
May 4, 2020   (DE) ..................... 10 2020 111 941.0

(51) Int. Cl.
*B60R 16/033*   (2006.01)
*B60L 58/10*    (2019.01)
*H02J 7/00*     (2006.01)

(52) U.S. Cl.
CPC ............ *B60R 16/033* (2013.01); *B60L 58/10* (2019.02); *H02J 7/0024* (2013.01); *B60L 2210/10* (2013.01); *H02J 2310/48* (2020.01)

(58) Field of Classification Search
None
See application file for complete search history.

(56) References Cited

U.S. PATENT DOCUMENTS 9,281,700 B2    3/2016  Feuerstack et al.
11,235,717 B2   2/2022  Woerner
(Continued)

FOREIGN PATENT DOCUMENTS

DE   102008062203 A1   6/2010
DE   102010041040 A1   3/2012
(Continued)

OTHER PUBLICATIONS

International Search Report of the International Searching Authority directed to related International Patent Application No. PCT/EP2021/061364, mailed Jul. 19, 2021, with attached English-language translation; 7 pages.

(Continued)

*Primary Examiner* — Jared Fureman
*Assistant Examiner* — Aqeel H Bukhari
(74) *Attorney, Agent, or Firm* — Sterne, Kessler, Goldstein & Fox P.L.L.C.

(57) ABSTRACT

The present disclosure relates to an on-board electrical network for a motor vehicle. The motor vehicle comprises a battery cell unit configured as a so-called SmartCell. The on-board electrical network also comprises a controller for operating the battery cell unit. In order to be able to be supplied with electric energy, the controller comprises a supply connection for supplying a supply voltage. The supply voltage is usually supplied by an energy supply device of the on-board electrical network, which is coupled to the controller via a first connection line. In order to allow for a redundant energy supply for the controller, a second connection line is provided in addition to the first connection line, via which a battery cell of the respective battery cell unit is coupled to the supply connection. The supply voltage can thus be supplied either via the first connection line or via (Continued)

the second connection line on the basis of an operating state of the energy supply device.

13 Claims, 1 Drawing Sheet

(56) References Cited

U.S. PATENT DOCUMENTS

| | | | |
|---|---|---|---|
| 11,351,866 B2 | 6/2022 | Lopez De Arroyabe | |
| 2004/0130214 A1* | 7/2004 | Murty | H02J 7/1423 307/66 |
| 2011/0210605 A1* | 9/2011 | Duan | H02J 7/0031 307/9.1 |
| 2013/0241472 A1* | 9/2013 | Feuerstack | H02J 7/345 320/107 |
| 2015/0298631 A1 | 10/2015 | Belger et al. | |
| 2020/0086762 A1* | 3/2020 | Kirchhoffer | B60L 3/0023 |

FOREIGN PATENT DOCUMENTS

| | | |
|---|---|---|
| DE | 102012220549 A1 | 5/2014 |
| DE | 102012221570 A1 | 5/2014 |
| DE | 102014208117 A1 | 11/2015 |
| DE | 102017208030 A1 | 11/2018 |
| DE | 102018205850 A1 | 10/2019 |
| DE | 102018213130 A1 | 2/2020 |
| EP | 1520752 A1 | 4/2005 |
| EP | 2426005 A2 | 3/2012 |
| EP | 3576241 A1 | 12/2019 |
| EP | 3620321 A1 | 3/2020 |
| WO | WO 2016/174117 A1 | 11/2016 |

OTHER PUBLICATIONS

International Preliminary Report on Patentability directed to related International Patent Application No. PCT/EP2021/061364, issued Nov. 8, 2022, with attached English-language translation; 17 pages.

* cited by examiner

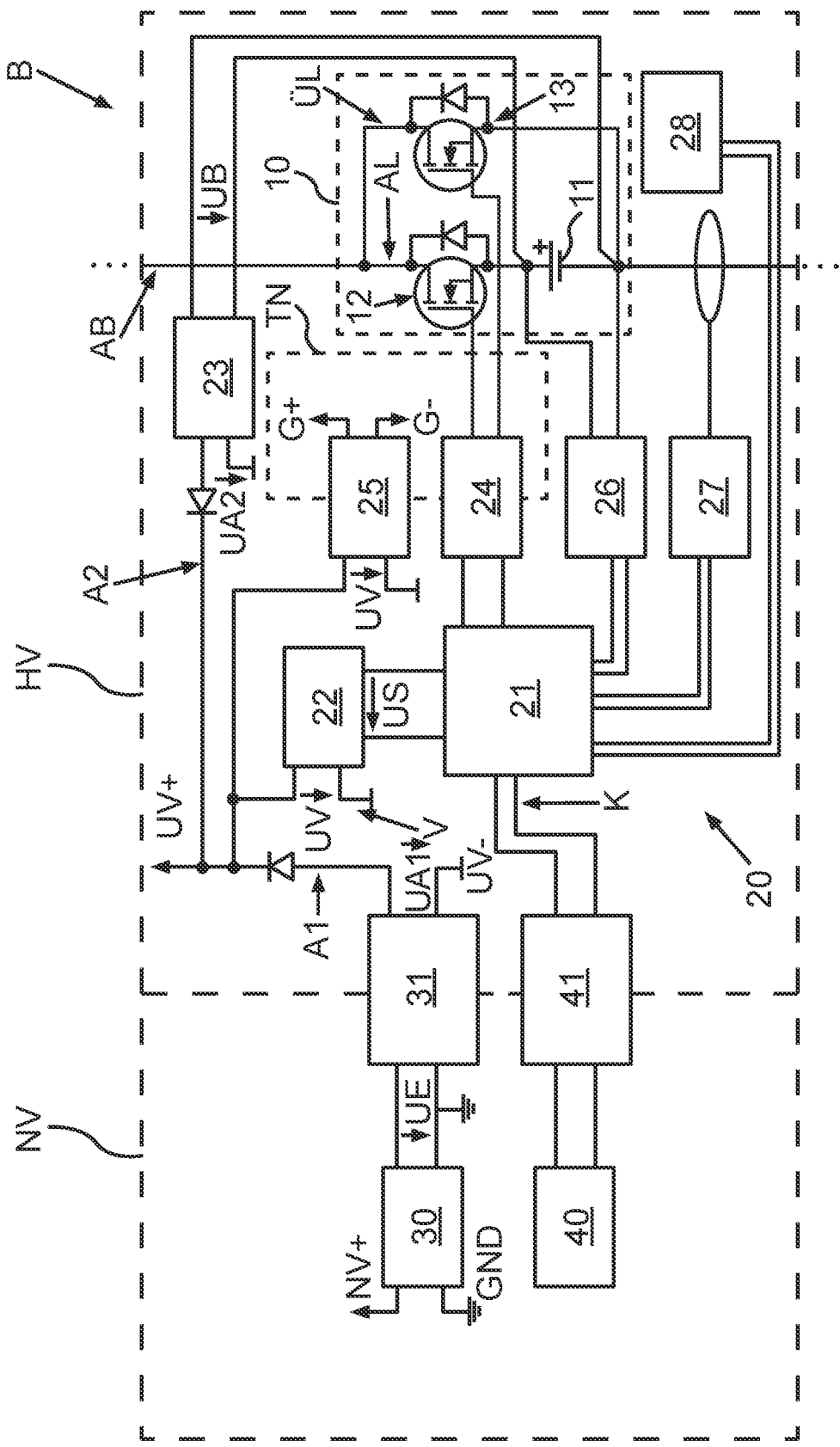

ON-BOARD POWER SYSTEM FOR A MOTOR VEHICLE, AND METHOD FOR OPERATING AN ON-BOARD POWER SYSTEM

TECHNICAL BACKGROUND

The present disclosure relates to an on-board electrical network for a motor vehicle, comprising at least one battery cell unit, a controller, and an energy supply device. The present disclosure also relates to a method for operating such an on-board electrical network.

Such an on-board electrical network usually has the function of ensuring an energy supply for electrical and electronic components of the motor vehicle. For this purpose, the on-board electrical network comprises at least one or more of the aforementioned battery cell units, whose operating state or operating mode can be monitored and controlled by the controller. The energy supply device is usually provided for supplying the controller with electric energy.

BACKGROUND

As disclosed in US 2011/0210605 A1, for example, the battery cell unit can be configured as a starter battery, for example. In order to be able to electrically decouple or disconnect the starter battery from the rest of the on-board electrical network in the event of a traffic accident, a mechanical battery disconnect switch is provided. A controller in the form of a microcontroller system is provided for controlling the disconnect switch. In this case, the microcontroller system is supplied with electric energy by an energy supply device. The energy supply device can draw its electric energy either from the starter battery or, if the starter battery fails, from an emergency power supply. A redundant energy supply for the controller can thus be ensured.

According to DE 10 2017 208 030 A1, the battery cell unit can also be used to supply power to a safety consumer in the on-board electrical network, such as a brake or a steering system for the motor vehicle. In order to be able to ensure a reliable energy supply for the safety consumer, the battery cell unit comprises a first and a second battery cell substring which can be coupled to the safety consumer on the basis of an operating situation and can therefore supply the safety consumer with energy. In this case, the battery cell substrings are thus used for the redundant energy supply of the safety consumer.

However, the battery cell units, as they are known from the aforementioned prior art, are not suitable for use in a drive battery or a high-voltage battery for operating an electric drive of the motor vehicle.

An on-board electrical network having a battery cell unit for operating an electric drive of a motor vehicle is known, for example, from EP 3 576 241 A1. In this case, the battery cell unit is assigned to a control unit, by means of which an operating parameter of the battery cell unit, such as a state of charge or an energy requirement, can be monitored and controlled. In this case, the control unit has two different operating modes, namely an active mode and a sleep mode. For operation in the active mode, the control unit is connected to the entire string of the battery cell unit via a step-down converter. However, for operation in the sleep mode, the control unit is additionally only connected to one substring of the battery cell unit. It is therefore particularly important to provide the control unit with different voltage levels by means of the battery cell unit, depending on the operating mode set. However, a redundant power supply for the control unit is not provided in this case.

BRIEF DESCRIPTION OF DRAWINGS/FIGURES

FIG. 1 a schematic representation of a circuit diagram of the on-board electrical network for a motor vehicle with a redundant energy supply for a controller for operating a battery cell unit of the on-board electrical network.

DETAILED DESCRIPTION

The problem addressed by the present disclosure is that of providing reliability for a controller for operating at least one battery cell unit of an on-board electrical network for a motor vehicle, which in particular represents a component of a drive battery of the motor vehicle.

The problem is solved by the subject matter of the independent claims. Advantageous developments of the present disclosure are disclosed by the dependent claims, the following description, and the drawing.

For this purpose, as described above, an on-board electrical network for a motor vehicle, in particular an electric vehicle or hybrid vehicle, is provided. The on-board electrical network comprises at least one, i.e., one or more, battery cell units. Such a battery cell unit usually comprises one or more battery cells or galvanic cells which can be connected to one another in a known manner. The respective battery cell unit is preferably assigned to a drive battery or a high-voltage battery of the motor vehicle. For example, a plurality of battery cell units can be interconnected or combined in a known manner to form the drive battery. The on-board electrical network also comprises a controller for operating the respective battery cell unit. "Operating" refers in particular to controlling and monitoring an operating state of the respective battery cell unit. The controller is preferably assigned to one or more battery cell units connected in parallel, for example. The controller can be realized in particular as a control circuit having one or more control devices. In order to supply the controller with electric energy for operating the battery cell unit, the on-board electrical network also comprises an energy supply device. The configuration of the energy supply device will be described in more detail below.

However, in modern electric vehicles or hybrid vehicles, the battery cell unit described above can be replaced, for example, by a switchable battery cell unit or a SmartCell battery cell. Accordingly, the respective battery cell unit comprises an activation line with the galvanic cell and a first semiconductor switch electrically connected in series thereto. Furthermore, the battery cell unit also comprises a bypass line which is electrically connected in parallel to the activation line and has a second semiconductor switch. The controller is then configured accordingly to operate the first and the second semiconductor switch in a predetermined switching mode. This means that the controller can provide a control signal for switching or switching over the semiconductor switches. In this case, "switching mode" means that the semiconductor switches can be switched into a switched-on switching state and into a switched-off switching state. In the switched-on switching state, the respective semiconductor switch has very good conductivity, so that a high current flow via the respective semiconductor switch is possible. In the switched-off switching state, the respective semiconductor switch has a high resistance, i.e., the respective semiconductor switch provides a high electrical resistance. As a result, no or only a negligibly small flow of electrical current is possible via the respective semiconductor switch. A semiconductor switch is in particular a controllable electronic switch, such as a transistor, a thyristor, combination circuits thereof, in particular with freewheeling diodes connected in parallel, for example, a metal—oxide—semiconductor field-effect transistor (MOSFET), an insulated-gate bipolar transistor (IGBT), preferably with an integrated freewheeling diode, or the like.

For the semiconductor switches to be switchable in the switching mode by means of the controller, the controller comprises a supply connection for supplying electric energy in the form of a supply voltage. In this case, the controller is usually coupled to the energy supply device via the supply connection. In this case, "coupling" means in particular an electrical coupling, i.e., an electrically conductive connection. Therefore, terms such as "connect" or "link" can also be used as a synonym for the term "couple" within the scope of the present disclosure. This means that the supply voltage is usually provided to the supply connection by means of the energy supply device.

However, in the event of a malfunction of the energy supply device, such as a failure, the controller can also experience a failure. Since the semiconductor switches are electronic switches, said failure can result in an undefined switching state of the semiconductor switches. The malfunction of the energy supply device can therefore result in the battery cell of the battery cell unit being disconnected unintentionally or in an unintentional short circuit in the battery cell unit.

In order to avoid said malfunctions, the present disclosure now provides for the controller to be supplied redundantly via the supply voltage. For this purpose, the aforementioned supply connection, on the basis of an operating state or functionality of the energy supply device, becomes couplable to the energy supply device via a first connection line and to the battery cell of at least one of the respective battery cell units via a second connection line. On the basis of the operating state of the energy supply device, the supply voltage can therefore be fed to the supply connection either via the first connection line, by means of which the controller can be coupled to the energy supply device, or via the second connection line, by means of which the controller can be coupled to the battery cell.

In a normal operating state of the energy supply device, the supply voltage can in this case preferably be fed to the supply connection via the first connection line. However, in the event of a malfunction of the energy supply device, the supply voltage can be fed to the supply connection via the second connection line. The malfunction can be detected, for example, as a dip or drop in voltage in the first connection line. Therefore, either a battery cell voltage (voltage provided by the battery cell) or an energy supply device voltage (voltage provided by the energy supply device) can be used to supply the supply voltage.

This results in the advantage that the controller can continue to be supplied with electric energy even if there is a malfunction in the energy supply device. In this case, the supply voltage is provided directly by the respective battery cell unit, in particular its battery cell. In this way, the reliability of the controller and thus also of the drive battery of the motor vehicle can be ensured.

The present disclosure also comprises further embodiments which result in additional advantages.

In one embodiment of the present disclosure, it is provided that the electric energy to be provided to the controller is provided by different subnetworks of the on-board electrical network. The on-board electrical network comprises a high-voltage network as the first subnet, and as the second subnetwork, the on-board electrical network comprises a low-voltage network that is galvanically isolated from the high-voltage on-board electrical network. In this case, the battery cell unit and the controller are assigned to the high-voltage network, while the energy supply device is assigned to the low-voltage on-board electrical network. Therefore, in the normal operating state, the controller can be supplied with the supply voltage from the low-voltage network. In the event of a malfunction, however, the energy is supplied directly from the high-voltage network itself.

The high-voltage network and the low-voltage network differ in a known manner, in particular in terms of their voltage level and their respective reference potential or ground potential. A respective (high) voltage in the high-voltage network, such as the supply voltage, can thus be tapped as a reference potential, for example, between a positive supply potential and a negative supply potential. The supply voltage can be, for example, 20V DC (V: volts; DC: direct current). However, a respective (low) voltage in the low-voltage network such as the energy supply device voltage can be tapped as a reference potential between a positive low-voltage potential and a negative low-voltage potential or ground potential (GND: ground). The energy supply device voltage can be 12V DC, for example.

In order to enable the energy transmission between the high-voltage network and the low-voltage network, the energy supply device is preferably coupled to the controller via a galvanically isolating converter device, such as a direct voltage converter (DC/DC converter) with galvanic isolation. For this purpose, the converter device can be connected, for example, with one end to the energy supply device and with another end to the first connection line of the controller. Particularly preferably, the converter device can in this context also be configured to provide a so-called step-up converter function. The lower energy supply device voltage can thus be converted into the higher supply voltage by means of the converter device.

In a further embodiment of the present disclosure, it is provided that the controller has an additional converter unit for the aforementioned battery cell voltage. This means that the converter unit is configured to convert the battery cell voltage provided by the battery cell into the supply voltage. For this purpose, the converter unit can be connected, for example, with one end to the battery cell of the battery cell unit and with another end to the second connection line of the controller. The converter unit is preferably configured as a DC/DC converter (without galvanic isolation) with a step-up converter function. A battery cell for a drive battery usually only provides a voltage between 2.5V DC and 4.2V DC. The battery cell voltage can thus be increased to the supply voltage of 20V DC, for example, by means of the converter unit.

Different options for determining the respective operating state of the energy supply device are realized in the following embodiments. For this purpose, one embodiment of the present disclosure provides that the controller additionally comprises a communication port for coupling to a communication device assigned to the energy supply device. In order to determine the operating state, the controller is configured to evaluate a communication signal from the communication device and provided via the communication port. This means that the communication device can transmit the operating state to the controller in encoded form in the communication signal.

In this case, the communication device can be part of a battery management system of the on-board electrical network, for example. The communication device is preferably configured as a transceiver or transducer (transmitter/receiver device). This allows for bidirectional signal transmission or communication between the controller and the communication device. The communication can take place, for example, via a BUS communication, i.e., via a connection to a CAN BUS of the motor vehicle, for example. The communication device is advantageously also arranged in the aforementioned low-voltage network. In order to enable signal transmission between the communication device and the controller, the communication device is preferably connected to the communication port of the controller via a galvanically isolating digital isolator.

In a further embodiment of the present disclosure, it is provided that the controller itself comprises a sensor unit in order to determine the operating state of the energy supply device. The sensor unit is configured to detect a voltage provided via the first connection line by means of the energy supply device. The controller is configured to evaluate the detected voltage according to a predetermined evaluation criterion for determining the operating state of the energy supply device. According to the predetermined evaluation criterion, the controller can check, for example, whether the detected voltage is within a predetermined voltage interval. In this case, the voltage interval can be determined by predetermined voltage limit values. If the detected voltage exceeds or falls below one of the respective voltage limit values, the controller can thus be used to conclude that there is a malfunction in the energy supply device. In order to detect or measure the voltage provided by means of the first connection line, the sensor unit can comprise, for example, a voltage sensor or a current sensor.

In the following embodiments, different options are now realized as to how the supply voltage can be supplied either via the first or the second connection line on the basis of the operating state of the energy supply device. For this purpose, it is provided in a further embodiment of the present disclosure that the controller comprises a disconnector unit for the two connection lines. The controller is configured to switch the disconnector unit to couple the first connection line to the supply connection or the second connection line to the supply connection on the basis of the operating state of the energy supply device. The respective connection line can thus be activated or deactivated by means of the disconnector unit. Therefore, it is possible to actively switch or alternate between the connection lines. For this purpose, the disconnector unit can comprise, for example, one or more toggle switches that can be operated electronically. Such a toggle switch can preferably be configured as a relay, or contactor, or semiconductor switch.

Additionally or alternatively to the active switching by means of the disconnector unit, the energy supply source can also be switched over automatically from the energy supply device to the battery cell, and vice versa. For this purpose, a further embodiment of the present disclosure provides that the first and the second connection line are connected to the supply connection in an electrical parallel connection. In addition, the energy supply device is configured, in a normal operating state, to provide a voltage via the first connection line (first connection voltage), which is greater by a predetermined difference than a voltage which is provided by the battery cell via the second connection line (second connection voltage). In the event of a malfunction, however, the energy supply device is configured to provide a first connection voltage which is lower than the second connection voltage. The difference can in this case be selected by a person skilled in the art according to a design of the controller. The difference can preferably be between 0.1V DC and 1V DC. In the normal operating state, the first connection voltage can be approximately 20V DC, for example. Therefore, the second connection voltage in the normal operating state can be 19V DC, for example. A malfunction of the energy supply device results, as described above, in a dip in the energy supply device voltage and thus also in the first connection voltage. In the event of the malfunction, the first connection voltage then preferably has a lower voltage amount than the second connection voltage. For example, the first connection voltage can then be approximately 0V DC.

The parallel connection of the two connection lines to the supply connection results in the advantage that the higher of the two voltages is always automatically provided and fed to the supply connection as the supply voltage. The energy supply is therefore more resistant, in particular to fluctuations in the first connection voltage or the energy supply device voltage.

In a further embodiment of the present disclosure, an advantageous design of the switching mode is implemented. In this case, the controller is configured to operate the semiconductor switches in accordance with the predetermined switching mode in a cycle operation when the energy supply device is in the normal operating state. In the event of a malfunction of the energy supply device, however, the controller is configured to switch the semiconductor switches to a predetermined switching state and preferably keep them in this switching state. Therefore, each of the semiconductor switches is switched to either the switched-on or the switched-off state. The switching mode is therefore also dependent on the operating state of the energy supply device. As a result, a defined switching state of the semiconductor switches can be set in the event of a malfunction. Furthermore, the energy consumption of the controller for operating the semiconductor switches can also be minimized or reduced.

The aforementioned cycle operation means in particular that the semiconductor switches are switched cyclically according to a predetermined switching pattern. Therefore, a plurality of switching operations of the semiconductor switches from the switched-on state to the switched-off state and vice versa is provided in chronological succession. For this purpose, the controller can, for example, provide a corresponding pulse-width modulated control signal for switching the respective semiconductor switch. The switching pattern can in this case be selected or specified, for example, by a battery management system on the basis of the energy requirement of the electric drive of the motor vehicle.

In order to monitor the battery cell unit with regard to its functionality, a further embodiment of the present disclosure provides that the controller comprises a monitoring unit for the battery cell unit. The monitoring unit is configured to detect a monitoring signal comprising at least one physical parameter of the battery cell unit. The controller is then configured to evaluate the respective monitoring signal to determine the operating state of the battery cell unit. In addition, the controller is configured to store the respective monitoring signal in a data memory of the controller in the event of a malfunction of the energy supply device. This means that the controller also has a data memory in order to temporarily store the respective monitoring signal.

A respective operating mode or a failure of the battery cell unit, for example, can thus be diagnosed and documented, even if the malfunction of the energy supply device has occurred. The diagnosis or the monitoring of the battery cell unit usually takes place in the aforementioned battery management system of the motor vehicle. As described above, this battery management system is usually located in the low-voltage network. However, if the energy supply device fails, the low-voltage on-board electrical network can also fail, so that the battery cell unit can no longer be monitored by the battery management system.

For example, a voltage, a current, or a temperature of the battery cell unit can be detected or measured as the physical parameter. Consequently, the monitoring unit can, for example, also comprise at least one voltage sensor and/or at least one current sensor and/or at least one temperature sensor.

The present disclosure also relates to a method for operating an on-board electrical network as described above. A supply voltage for operating the semiconductor switches in the predetermined switching mode is fed to the controller of the on-board electrical network via a supply connection. On the basis of the previously described operating state of the energy supply device, the supply connection is then coupled to the energy supply device via the first connection line and to the respective battery cell of at least one of the respective battery cell units via a second connection line.

The present disclosure also comprises developments of the method according to the present disclosure, which have features such as those already described in connection with the developments of the on-board electrical network according to the present disclosure. For this reason, the corresponding developments of the method according to the present disclosure are not described again herein.

The present disclosure also comprises the combinations of the features of the described embodiments.

The embodiments described below are preferred embodiments of the present disclosure. In the embodiments, the described components of the embodiments each represent individual features of the present disclosure which should be considered in isolation and which each develop the present disclosure independently of one another. The disclosure is therefore also intended to comprise combinations of the features of the embodiments other than those presented. In addition, the embodiments described may also be supplemented with further features of the present disclosure which have already been described.

In the drawing, the same reference signs designate elements that have the same function.

FIG. 1 shows a schematic representation of an embodiment of an on-board electrical network B, as can be installed in a motor vehicle. In this case, the on-board electrical network B comprises two galvanically isolated subnetworks, namely initially a low-voltage network or low-voltage on-board electrical network NV and a high-voltage network or high-voltage on-board electrical network HV. The two subnetworks differ in a known manner in their respective reference potentials. In the present case, the low-voltage on-board electrical network NV, which can be provided, for example, by a body of the motor vehicle, comprises a positive low-voltage potential NV+ and a ground potential GND as reference potentials. The high-voltage on-board electrical network HV comprises a positive supply potential UV+ and a negative supply potential UV− as reference potentials.

The high-voltage on-board electrical network HV comprises a battery cell unit 10 for providing electric energy for a drive of the motor vehicle and a controller 20 for controlling and monitoring the battery cell unit 10. The battery cell unit 10 can thus be part of the drive battery of the motor vehicle. In order to form the drive battery, the battery cell unit 10 can be connected to one or more further battery cell units in a known manner, for example, by means of a battery cell connection AB. As shown in FIG. 1, the battery cell unit 10 is configured as a so-called SmartCell. Therefore, the battery cell unit 10 comprises an activation line AL having a battery cell 11 and a first semiconductor switch 12 connected with a first end to a positive pole of the battery cell 11. The battery cell unit also comprises a bypass line UL having a second semiconductor switch 13. In this case, the second semiconductor switch 13 is connected with a first end to a negative pole of the battery cell 11. In addition, the two semiconductor switches 12, 13 are connected directly to one another with a respective second end. In the present case, the semiconductor switches 12, 13 are configured by way of example as metal—oxide— semiconductor field-effect transistors (MOSFET) with a freewheeling diode connected in parallel.

Due to the configuration of the battery cell unit 10 as a SmartCell, it is now possible to adjust a voltage which can be provided for the electric drive via the battery cell connection AB. For this purpose, the first and the second semiconductor switch 12, 13 can be operated in a predetermined switching mode. This means that the semiconductor switches 12, 13 can be switched, for example, alternately or cyclically to a switched-on or activated switching state and to a switched-off or deactivated switching state on the basis of an energy requirement of the drive. A simultaneous activation or switching on of the semiconductor switches 12, 13 is thus avoided in the switching mode because it could lead to a short circuit in the battery cell 11.

The operation of the semiconductor switches 12, 13 in the switching mode is a function of the controller 20. For this purpose, the controller 20 comprises a control device 21 which can be configured, for example, as a microcontroller. A so-called gate driver 24 is connected to the control device 21. The semiconductor switches 12, 13 can be switched by means of the gate driver 24 on the basis of a corresponding control command from the control device 21. For this purpose, the gate driver 24 preferably has a logic or logic circuit in order to always lock one of the semiconductor switches 12, 13 and thus keep it in the deactivated switching state. Therefore, the aforementioned simultaneous switching on of the semiconductor switches 12, 13 can be effectively prevented. With MOSFETs, switching, i.e., switching to a defined switching state, is usually carried out by setting the so-called gate voltage of the respective semiconductor switch 12, 13. For example, by setting a gate voltage of 15V DC, the respective semiconductor switch 12, 13 can be switched to the switched-on switching state and thus have very good electrical conductivity. However, when a gate voltage of −8V DC is set, the respective semiconductor switch 12, 13 can be switched to the switched-off or electrically high-impedance switching state.

The gate voltage generally does not relate to the positive supply potential UV+ and the negative supply potential UV− of the high-voltage on-board electrical network HV. In order to provide the gate voltage, the controller 20 therefore comprises a galvanically isolated gate converter unit 25 which is connected to the positive supply potential UV+ and the negative supply potential UV−. A galvanically isolated driver network TN with reference potentials different from the positive supply potential UV+ and the negative supply potential UV− is realized by means of the gate converter unit 25. As reference potentials, the driver network TN comprises a positive gate potential G+ and a negative gate potential G− between which the respective gate voltage can be tapped.

In order to be able to realize the previously described control of the battery cell unit 10, an electric energy supply for the controller 20 and in particular for the aforementioned control device 21 is to be provided. For this purpose, the controller 20 in the present case comprises a supply connection V, by means of which the controller 20 is connected to the positive supply potential UV+ and the negative supply potential UV−. A supply voltage UV can be fed to the controller 20 via the supply connection V.

The supply voltage UV is usually made available to the supply connection V via the low-voltage on-board electrical network NV. For this purpose, the low-voltage on-board electrical network NV comprises an energy supply device 30 which in the present case is configured by way of example as a DC/DC converter connected to the positive low-voltage potential NV+ and the ground potential GND. The DC/DC converter can thus be used to convert a voltage, not defined in more detail below, which can be tapped between the positive low-voltage potential NV+ and the ground potential GND, into an energy supply device voltage UE. In normal operation of the energy supply device 30, the energy supply device voltage UE can be 12V DC, for example.

In order to provide the energy supply device voltage UE for the controller 20, as shown in FIG. 1, the energy supply device 30 is connected to a first connection line A1 of the controller 20 via a galvanically isolated converter device 31. The first connection line A1 is in turn connected directly to the supply connection V. An energy supply device voltage UE generated by means of the energy supply device 30 can thus be converted into a first connection voltage UA1 which can be tapped in the first connection line A1. The first connection voltage UA1 can then be fed to the supply connection V as the supply voltage. In normal operation of the energy supply device 30, the first connection voltage UA1 can be 20V, for example. Accordingly, the converter device 31 can in the present case be configured, for example, as a galvanically isolated step-up converter for raising the energy supply device voltage UE to the first connection voltage UA1. In order to prevent electric energy from being transmitted from the controller 20 to the low-voltage on-board electrical network as well, a freewheeling diode is also connected in the present case to the first connection line.

In order to provide the supply voltage UV for the control device 21, the control device 21 is connected to the supply connection via a converter unit 22. In the present case, the converter unit 22 is configured as a DC voltage step-down converter. The supply voltage UV applied to the supply connection V can thus be reduced to a control device voltage US to be provided to the control device 21. During normal operation of the energy supply device 30, the controller voltage US can be 5V DC, for example.

However, if there is a malfunction in the low-voltage on-board electrical network NV and thus a malfunction of the energy supply device 30, the energy supply to the controller 20 from the low-voltage on-board electrical network NV can no longer be ensured. The malfunction can be a complete failure of the energy supply device 30, for example. Alternatively, the malfunction can also be a temporarily limited or short-term fluctuation of the energy supply device voltage UE. The malfunction therefore results in a dip or drop in the energy supply device voltage UE in comparison to an amount of the energy supply device voltage UE in the normal operating state. Consequently, there is also a drop in the first connection voltage UA1, so that the controller 20 can no longer be provided with the full supply voltage of 20V DC, for example. As a result, sufficient electric energy to supply the control device 21, the gate driver 24, and the gate converter 25 is no longer available and an undefined switching state of the semiconductor switches 12, 13 can occur. For example, the battery cell 11 can thus be undesirably bypassed or the battery cell unit 10 can be short-circuited to further battery cell units of the drive battery.

In order to avoid such a causal chain of events in the event of a failure of the energy supply device 30, a redundant energy supply is provided in the present case directly from the high-voltage on-board electrical network HV. In this case, the energy supply source is provided by the battery cell 11 of the battery cell unit 10. For this purpose, the battery cell 11 is connected (in each case with its positive and negative pole) to a second connection line A2 via a further converter unit 23. The second connection line A2 is then connected directly to the supply connection V in an electrical parallel connection to the first connection line A1. A battery cell voltage UB generated by the battery cell 11 can thus be converted into a second connection voltage UA2 which can be tapped in the second connection line A2. A typical value for the battery cell voltage UB lies generally between 2.5V DC and 4.2V DC. Therefore, the converter unit 23 can in the present case be configured, for example, as a DC voltage step-up converter. The battery cell voltage UB can thus be raised to the second connection voltage UA2. The second connection voltage UA2 can then be fed to the supply connection V as the supply voltage UV.

During normal operation of the energy supply device 30, a slightly lower voltage level than a voltage amount of the first connection voltage UA1 is selected or set for the second connection voltage UA2. For example, the second connection voltage UA2 can be 19.5V DC. Depending on the operating state (normal operation or malfunction) of the energy supply device 30, the supply voltage UV can thus be provided automatically either by means of the first or the second connection line A1, A2. Therefore, the energy source for supplying the controller 20 in the on-board electrical network B can be switched or alternated particularly quickly. As a result, even minor fluctuations or voltage dips in the low-voltage on-board electrical network NV can be easily compensated.

As described above, the controller 20 not only has the function of controlling the battery cell unit 10 but is also responsible for monitoring operating parameters of the battery cell unit 10. For this purpose, the controller 20 in the present case comprises a voltage sensor 26, a current sensor 27, and a temperature sensor 28 which are each connected individually to the control device 21. By means of said sensors, a respective physical parameter of the battery cell unit 10 can thus be measured and provided for evaluation to the control device in the form of a monitoring signal. For example, by means of the voltage sensor 26, the battery cell voltage UB can be measured as a physical parameter. A current provided by the battery cell unit 10 can be measured as a physical parameter by means of the current sensor 27. Finally, a temperature can be measured as a physical parameter by means of the temperature sensor 28. During the subsequent evaluation, the control device can check, for example, whether or not the respective physical parameter is within a desired value range. Therefore, it can be concluded as to whether there is a malfunction in the battery cell unit 10. An operating mode of the battery cell unit 10 is thus preferably determined by the evaluation of the monitoring signal or signals by means of the control device 21.

In order to be able to monitor each battery cell unit 10 individually and also a plurality of battery cell units that together form the drive battery, the specific operating mode is also preferably transmitted, for example, as an operating mode signal, to a battery management system of the motor vehicle. The battery management system is usually located in the low-voltage on-board electrical network NV. In the present case, the battery management system is represented by way of example by a communication device 40 in the low-voltage on-board electrical network NV. In order to transmit the operating mode signal, the controller 20 also comprises a communication line K or a communication port which in the present case is connected directly to the control device 21. The communication device 40 is now connected to the communication line K via a digital converter 41 or digital isolator with galvanic isolation. The communication device 40, the digital converter 41, and the control device 21 can preferably be configured for the bidirectional transmission of signals. Therefore, for example, a control command can also be provided for the controller 20 by the battery management system.

In order to be able to continue to monitor the battery cell unit 10 in the event of a malfunction in the low-voltage network, the control device 20 preferably comprises a data memory (not shown). If the malfunction is present, the respective operating mode signal in the form of operating data can thus be temporarily stored in the data memory until, for example, communication with the communication device 40 is possible again. The battery cell unit 10 can therefore continue to be diagnosed even if the communication port with the low-voltage on-board electrical network NV fails.

Instead of an automatic selection of the energy supply source, active switching to the respective energy supply source can, alternatively to the embodiment shown in FIG. 1, also take place. For this purpose, the controller 20 can comprise, for example, a disconnecting unit in the form of a toggle switch, by means of which, on the basis of the functionality of the energy supply device 30, either the first connection line can be electrically conductively coupled to the supply connection or the second connection line can be electrically conductively coupled to the supply connection. In order to determine the functionality of the energy supply device 30, the control device 21 of the controller 30 can monitor the first connection voltage UAL for example. Alternatively, the operating state of the energy supply device 30 can also be communicated to the control device 21 of the controller 20 via the communication device 40.

According to this alternative embodiment of the on-board electrical network B, a corresponding method for operating the on-board electrical network B can comprise the following steps (not shown). In a decision step, the functionality, i.e., the operating state of the energy supply device 30, is first checked, as described above. If the control device 21 determines that the energy supply device 30 is in normal operation, the controller 21 can actuate the disconnector unit for the electrically conductive connection of the first connection line A1 to the supply connection V. As a result, the supply voltage UV can be fed to the controller 20 by means of the energy supply device 30. However, if it is determined during the check that the energy supply device 30 has a malfunction, the control device 21 can instead actuate the disconnector unit to electrically disconnect the first connection line A1 and the supply connection V and to electrically conductively connect the second connection line A2 and the supply connection V. The supply voltage UV for operating the controller 20 can thus be provided by means of the battery cell 11.

Overall, the examples show how a redundant energy supply can be provided in a SmartCell for an electric vehicle.

The invention claimed is:

1. An on-board electrical network for a motor vehicle, comprising:
    a battery cell unit comprising an activation line having a battery cell and a first semiconductor switch electrically connected in series thereto, and a bypass line electrically connected in parallel to the activation line having a second semiconductor switch;
    an energy supply device;
    a controller configured to operate the first and the second semiconductor switch in a predetermined switching mode, wherein the controller comprises a supply connection for supplying a supply voltage, and wherein the supply connection, based on an operating state of the energy supply device, is coupled to the energy supply device via a first connection line and to the battery cell of the battery cell unit via a second connection line; and
    a communication device assigned to the energy supply device, wherein the controller further comprises a communication port for coupling to a communication device, and wherein the controller is further configured to evaluate a communication signal provided via the communication port for determining the operating state of the energy supply device.

2. The on-board electrical network of claim 1, further comprising a high-voltage network and a low-voltage network galvanically isolated therefrom, wherein the battery cell unit and the controller are assigned to the high-voltage network, and the energy supply device is assigned to the low-voltage network.

3. The on-board electrical network of claim 1, wherein the controller further comprises a converter unit configured to convert a battery cell voltage provided by the battery cell into the supply voltage.

4. The on-board electrical network of claim 1, wherein:
    the controller further comprises a sensor unit configured to detect a voltage provided via the first connection line by the energy supply device, and
    the controller is further configured to evaluate the voltage according to a predetermined evaluation criterion for determining the operating state of the energy supply device.

5. The on-board electrical network of claim 1, wherein the controller further comprises a disconnector unit for the first connection line and the second connection line, wherein the controller is further configured to switch the disconnector unit to couple the first connection line to the supply connection, or couple the second connection line to the supply connection, based on the operating state of the energy supply device.

6. The on-board electrical network of claim 1, wherein:
    the first connection line and the second connection line are connected to the supply connection in a parallel electrical connection,
    the energy supply device in normal operation is configured to provide a voltage via the first connection line, which is greater than a voltage provided by the battery cell via the second connection line, and
    the energy supply device, in an event of a malfunction, is configured to provide a voltage via the first connection line, which is smaller than a voltage provided by the battery cell via the second connection line.

7. The on-board electrical network of claim 6, wherein:
the controller is further configured to operate the first semiconductor switch and the second semiconductor switch in accordance with the predetermined switching mode in a cycle operation when the energy supply device is in normal operation, and
the controller is further configured to switch the first semiconductor switch and the second semiconductor switch to a predetermined switching state in the event of a malfunction in the energy supply device.

8. The on-board electrical network of claim 6, wherein the controller further comprises:
a monitoring unit for the battery cell unit, configured to detect a monitoring signal comprising a physical parameter of the battery cell unit, and
wherein the controller is further configured to evaluate the respective monitoring signal to determine an operating state of the battery cell unit and, in the event of a malfunction of the energy supply device, to store the monitoring signal in a data memory of the controller.

9. The on-board electrical network of claim 1, wherein the controller is further configured to determine an operating mode of the battery cell unit by checking if a plurality of operating parameters of the battery cell unit are within a value range as an indication, and wherein the plurality of operating parameters comprise battery cell voltage, current provided by the battery cell unit, and temperature of the battery cell unit.

10. The on-board electrical network of claim 9, wherein the controller is further configured to determine a malfunction in the battery cell unit if an operating parameter of the plurality of operating parameters is outside a predetermined value range.

11. The on-board electrical network of claim 1, wherein the controller further comprises a gate driver configured to:
receive a control command from the controller to activate or deactivate the first semiconductor switch or the second semiconductor switch by applying a gate voltage to the first semiconductor switch or the second semiconductor switch.

12. The on-board electrical network of claim 1, further comprising a digital converter coupled to the communication device so that the communication device, the digital converter and the controller are configured for bidirectional transmission of signals.

13. A method for operating an on-board electrical network, the method comprising:
communicating a communication signal from an energy supply device to a communication port of a controller;
determining an operating state of the energy supply device by the controller based on the communication signal received from the energy supply device;
based on determining the operating state of the energy supply device to be a normal operating state, actuating a disconnector unit for electrically connecting a first connection line to a supply connection, and feeding a supply voltage to the controller by the energy supply device; and
based on determining the operating state of the energy supply device to be a malfunctioning operating state, actuating the disconnector unit for electrically disconnecting the first connection line and the supply connection and for electrically connecting a second connection line and the supply connection.

* * * * *